United States Patent
Ashmore et al.

(10) Patent No.: US 7,117,320 B2
(45) Date of Patent: Oct. 3, 2006

(54) MAINTAINING DATA ACCESS DURING FAILURE OF A CONTROLLER

(75) Inventors: Paul Ashmore, Longmont, CO (US); Matthew John Fairhurst, Winchester (GB); Michael Huw Francis, Winchester (GB); Robert Bruce Nicholson, Southsea (GB); Simon Walsh, Portsmouth (GB); Barry John Wood, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 10/608,721

(22) Filed: Jun. 26, 2003

(65) Prior Publication Data

US 2004/0049710 A1    Mar. 11, 2004

(30) Foreign Application Priority Data

Jun. 26, 2002    (GB)    ................................. 0214669.4

(51) Int. Cl.
G06F 11/00    (2006.01)
(52) U.S. Cl. ...................... 711/156; 711/114; 711/148; 711/150; 711/151; 711/162; 714/6
(58) Field of Classification Search ................ 711/114, 711/150, 156, 162; 714/5–6
See application file for complete search history.

(56) References Cited

U.S. PATENT DOCUMENTS

| | | | | |
|---|---|---|---|---|
| 5,758,120 | A * | 5/1998 | Kahle et al. ................. | 711/150 |
| 5,900,009 | A * | 5/1999 | Vishlitzky et al. ........... | 711/113 |
| 5,933,824 | A * | 8/1999 | DeKoning et al. ............ | 707/8 |
| 6,047,353 | A * | 4/2000 | Vishlitzky et al. ........... | 711/111 |
| 6,148,414 | A * | 11/2000 | Brown et al. ................. | 714/9 |
| 6,345,332 | B1 * | 2/2002 | Okazaki ...................... | 710/106 |
| 6,401,170 | B1 * | 6/2002 | Griffith et al. ............... | 711/114 |
| 6,477,619 | B1 * | 11/2002 | Fujimoto et al. ........... | 711/114 |
| 6,574,709 | B1 * | 6/2003 | Skazinski et al. ........... | 711/119 |
| 6,598,108 | B1 * | 7/2003 | Ashida et al. .............. | 710/305 |
| 6,601,138 | B1 * | 7/2003 | Otterness et al. ........... | 711/114 |
| 6,651,131 | B1 * | 11/2003 | Chong et al. ............... | 710/317 |
| 6,874,100 | B1 * | 3/2005 | Rauscher ...................... | 714/6 |
| 2002/0133743 | A1 * | 9/2002 | Oldfield et al. ............... | 714/11 |
| 2003/0135674 | A1 * | 7/2003 | Mason et al. ................. | 710/74 |

OTHER PUBLICATIONS

American National Standard for Information Technology "Fibre Channel Arbitrated Loop (FC-AL-2) Revision 7.0", Apr. 1, 1999.
American National Standard for Information Systems "SCSI-3 Enclosure Services Command Set (SES), Revision 8a", Jan. 16, 1997.

* cited by examiner

Primary Examiner—Matthew Kim
Assistant Examiner—Hetul Patel
(74) Attorney, Agent, or Firm—Randall J. Bluestone; Harrington & Smith, LLP

(57) ABSTRACT

A method for maintaining data access during failure of a controller in a multiple controller storage subsystem (103) is provided. The storage subsystem (103) has an array of data storage devices (109) and more than one controller (104, 105) for managing the data storage. The method comprises a first controller (201) saving its internal state information (212) and, optionally, resetting itself (213). One or more of the other controllers (202, 203) carry out the steps of pausing operation of the controller (221, 231), saving internal state information of the controller at the time of pausing (222, 232), and continuing operation of the controller (223, 233). The one or more other controllers (202, 203) may pause operation and save their internal state information when they receive a message broadcast (220, 230) from the first controller (201) which has detected an error.

34 Claims, 5 Drawing Sheets

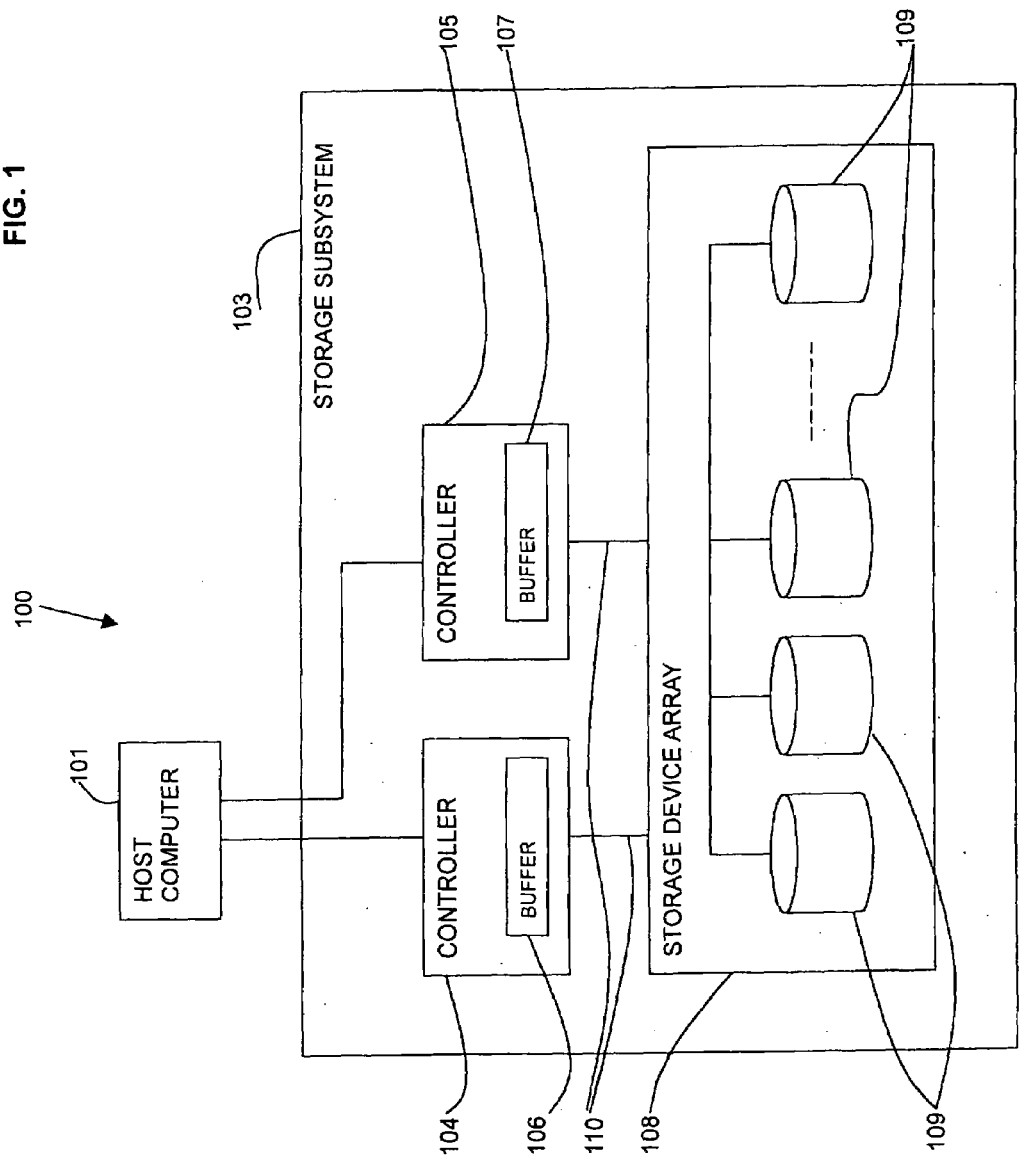

MAINTAINING DATA ACCESS DURING FAILURE OF A CONTROLLER

FIELD OF THE INVENTION

This invention relates to the field of storage subsystems and in particular to methods and apparatus which provide shared access to common storage devices by multiple storage controllers within a storage subsystem.

BACKGROUND OF THE INVENTION

Modern mass storage subsystems must provide increasing storage capacity to meet user demands from host computer system applications. Various storage device configurations are known and used to meet the demand for higher storage capacity while maintaining or enhancing reliability of the mass storage subsystem.

One of the storage configurations that meets demands for increased capacity and reliability is the use of multiple smaller storage modules which are configured to permit redundancy of stored data to ensure data integrity in case of failures. In such redundant subsystems, recovery from many types of failure can be automated within the storage subsystem itself due to the use of data redundancy. An example of such a redundant subsystem is redundant arrays of inexpensive disks (RAID).

Redundant storage subsystems commonly use two or more controllers that manage an array of storage devices for the host system. The controllers make the array of storage devices appear to the host system to be a single, high capacity storage device.

In a controller subsystem where there is a network of storage devices, it is common to have more than one controller with access to each storage device. In the event of failure of one of the controllers, the storage device can still be accessed by the other controller or controllers. This is referred to as the multi-initiator or failover (high availability) mode of operation.

In some error scenarios, a controller detects an error of such severity that the required recovery action is for the controller to reset itself. In these circumstances it is desirable for the controller to generate dump information in order to enable the subsequent diagnosis of the problem. One method often employed is to copy the controller's internal state information at the time of the error. This data is stored at a predetermined location by the controller before it resets itself. An example storage location is a physical disk.

During test processes, the controller detecting a problem can be set up to send a stop message to all other controllers. The other controllers will then do a state save before resetting to recover. This results in multiple controller dumps at the time of the error that are often essential to solve a problem. The feature where a failing controller sends a stop message to other controllers is often disabled in the field because the systems are high availability systems. Therefore, when problems happen, only one controller dump is taken which often is not sufficient to solve the problem.

Most problems should be detected and fixed during test procedures, but obviously, not everything can be caught. When field problems do occur, it is important to solve the problem quickly.

The problem with the above approach is that either all the controllers reset and there is a loss of access to storage devices during the simultaneous reset of the controllers, or only the defective controller resets and there is insufficient information to solve the defect.

DISCLOSURE OF THE INVENTION

According to a first aspect of the present invention there is provided a method for maintaining data access during failure of a controller in a multiple controller storage subsystem, the storage subsystem having an array of data storage devices and more than one controller for managing the data storage, the method comprising: the first controller saving internal state information; and one or more of the other controllers carrying out the steps of: pausing operation of the controller; saving internal state information of the controller at the time of pausing; and continuing operation of the controller.

In one embodiment, the first controller may detect an error in the first controller which triggers the saving of the internal state information.

In another embodiment, a host computer may issue a transaction to the first controller which causes it to save its internal state information.

The first controller may reset after saving its internal state information.

The first controller may instruct the other controllers to save their internal state information and the other controllers may carry out the defined steps when they receive the instruction. Alternatively, the one or more other controllers may carry out the defined steps when they detect a loss of the first controller.

The first controller and the one or more other controllers may save their internal state information to a storage location in each controller. The first controller and the one or more other controllers may save their internal state information to the storage devices and the information may be retrieved from the storage devices at a later stage. The first controller may instruct the other controllers to transfer their internal state information to the first controller and the first controller may save the combined internal state information to the storage devices.

The multiple controllers may be combined on a single card and/or share a single memory with each controller having a separate processor.

In addition to the internal state information, a controller may also save some external memory data.

The one or more other controllers may save a subset of their internal state information. The internal state information saved by the one or more other controllers may be determined by an instruction received from the first controller.

Problem analysis regarding an error in the first controller may be carried out on the saved internal state information.

The storage subsystem may be a Fibre Channel Arbitrated Loop system and the multiple controllers may be host bus adapters. During the defined method, interrupts may be disabled. A flag may be set in a host bus adapter during the saving of internal state information to prevent overlapping saves of internal state information in that adapter. The adapter may save information relating to an interface chip.

According to a second aspect of the present invention there is provided a computer program product stored on a computer readable storage medium for maintaining data access during failure of a controller in a multiple controller storage subsystem, the storage subsystem having an array of data storage devices and more than one controller for managing the data storage, comprising computer readable program code means for performing the steps of: the first controller saving internal state information; and one or more of the other controllers carrying out the steps of: pausing operation of the controller; saving internal state information of the controller at the time of pausing; and continuing operation of the controller.

BRIEF DESCRIPTION OF THE DRAWINGS

Embodiments of the present invention will now be described, by way of examples only, with reference to the accompanying drawings in which:

FIG. 1 is a block diagram of a computer system including a storage subsystem in which a method in accordance with the present invention may be carried out;

DESCRIPTION OF THE PREFERRED EMBODIMENTS

Figure 2A:
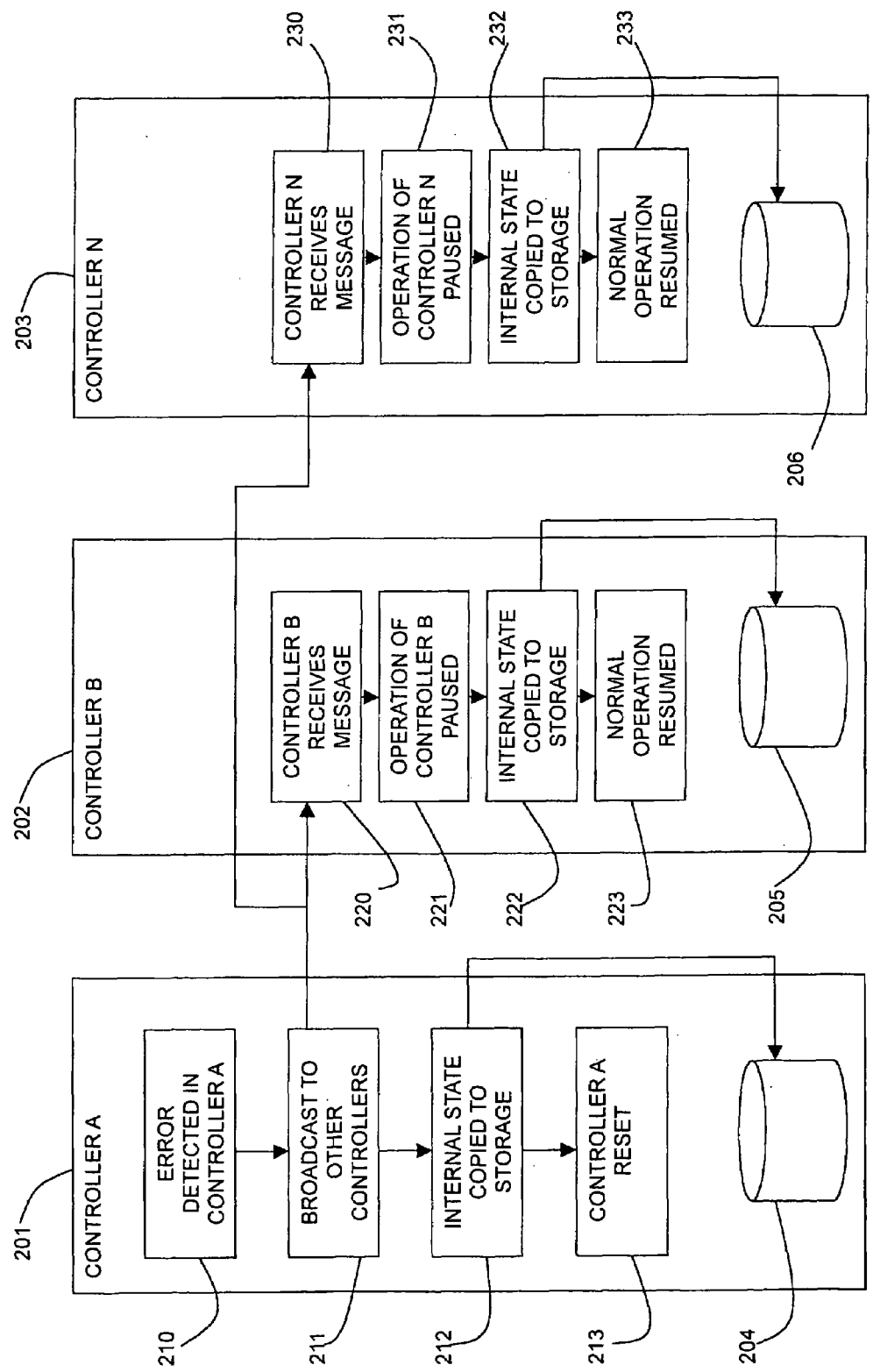
FIG. 2A is a flow diagram of a first embodiment in accordance with the present invention.

Referring to FIG. 1, a schematic block diagram of a computer system 100 with a storage subsystem 103 is shown in which the described method of the present invention may be applied. The storage subsystem 103 has a storage device array 108 with multiple storage devices 109. The storage devices 109 may be disk drives or other forms of storage device.

The storage device array 108 is managed by redundant storage array controllers 104, 105. In the diagram two controllers 104, 105 are shown and it will be appreciated by a person skilled in the art that any number of controllers and storage devices may be used in a wide range of configurations.

At least two of the controllers 104, 105 are connected to a host computer 101 to provide fault-tolerant access to data stored in the storage subsystem 103. The controllers 104, 105 make the storage device array 108 appear to the host computer 101 to be a single high capacity storage device. A large variety of arrangements of one or more host computers and the multiple controllers is possible and a simplified arrangement is shown in the figure.

The interface buses 110 between the controllers 104, 105 and the storage device array 108 including the storage devices 109 may be one of several industry standard interface buses including, for example, Small Computer System Interface (SCSI), Fibre Channel, Serial Storage Architecture (SSA), etc.

The controllers 104, 105 are sometimes referred to as adapters and include a storage buffer 106, 107 for storing internal state information of the controller at any given time.

A redundant controller system with at least two controllers is described. However, it will be appreciated by a person skilled in the art that the two or more controllers may in practice be combined such that they are on the same card and/or share a single memory. Such a combination of a plurality of controllers has a plurality of separate processors and therefore is considered in this context to be more than one controller.

FIG. 2A shows a first embodiment of the described method as carried out in multiple controllers 201, 202, 203 labelled as controller A, controller B and controller N. The method steps taken in each controller 201, 202, 203 are shown in the form of flow diagrams.

One of the multiple controllers, controller A 201, detects an error 210 in that controller 201. Controller A 201 sends an instruction, which may be by broadcasting 211 a message, to the other controllers 202, 203. Controller A 201 then copies 212 its internal state to a storage buffer 204 in controller A 201. Controller A 201 then resets itself 213. During the resetting process, controller A 201 is out of action and cannot accept commands to access the storage device array.

In controller B 202, the message broadcast from controller A 201 is received 220. The operation of controller B 202 is paused 221 for sufficient time for the internal state of controller B 202 to be copied 222 to a storage buffer 205 in controller B 202. Normal operation of controller B 202 is then resumed 223.

Similarly, in controller N 203, the message broadcast from controller A 201 is received 230 and the operation of controller N is paused 231. The internal state of controller N 203 is copied 232 to a storage buffer 206 in controller N 203 and normal operation of controller N 203 is resumed 233.

Since only controller A 201, which is the controller which detected the error, resets itself access to the storage devices is maintained through the other controllers B and N 202, 203.

Figure 2B:
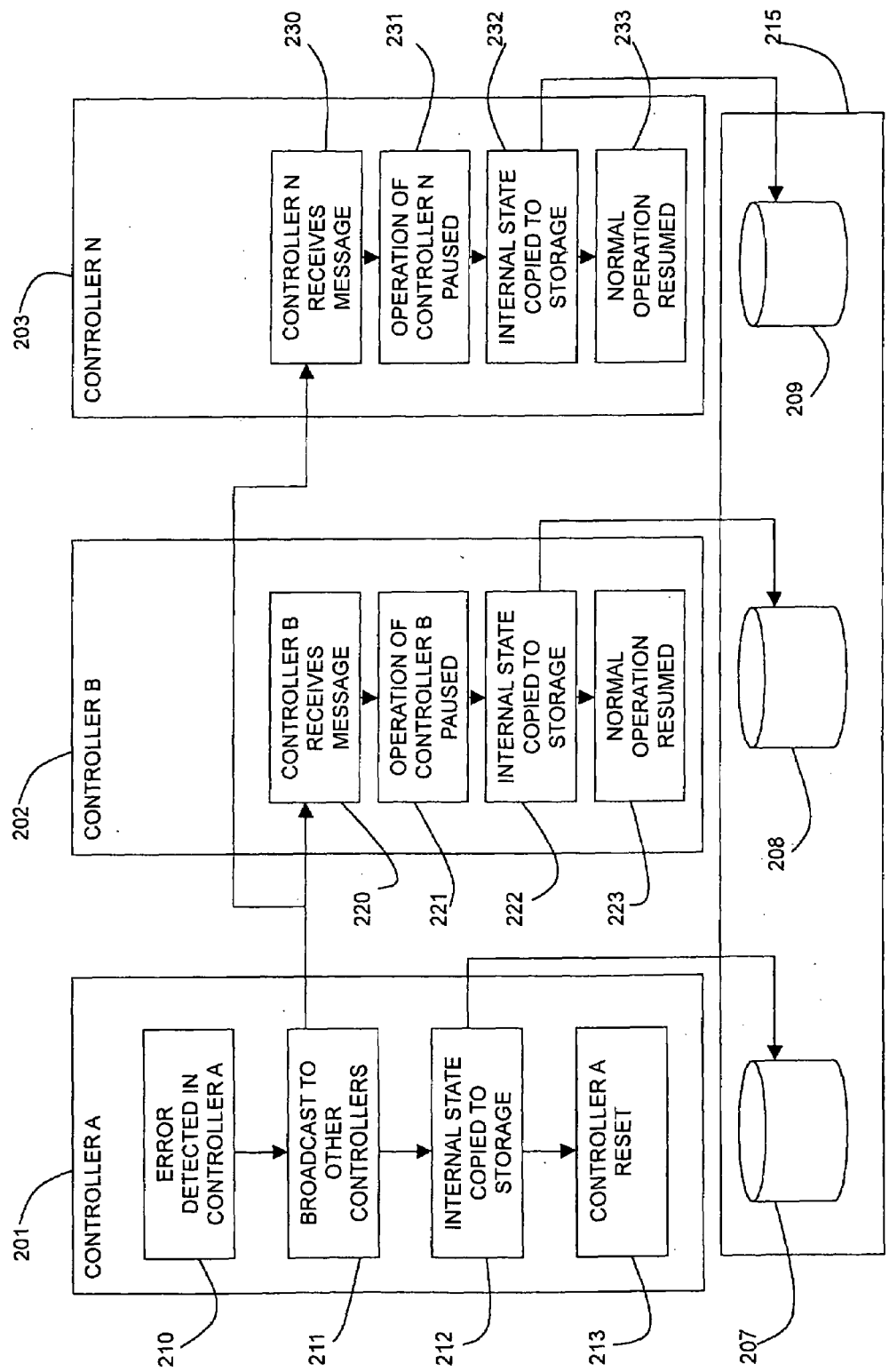
FIG. 2B is a flow diagram of a second embodiment in accordance with the present invention.

FIG. 2B shows a second embodiment of the described method. In this embodiment, controller A 201 saves or dumps the copy of its internal state data to a predetermined storage location 207 in the storage device array 215. Similarly, the other controllers B 202 and N 203 save their internal state data to predetermined storage locations 208, 209 in the storage device array 215.

The dumped information that has been saved to predetermined locations 207, 208, 209 in the storage device array 215 can be retrieved as required by controller A 201 which detected the error 210.

Figure 2C:
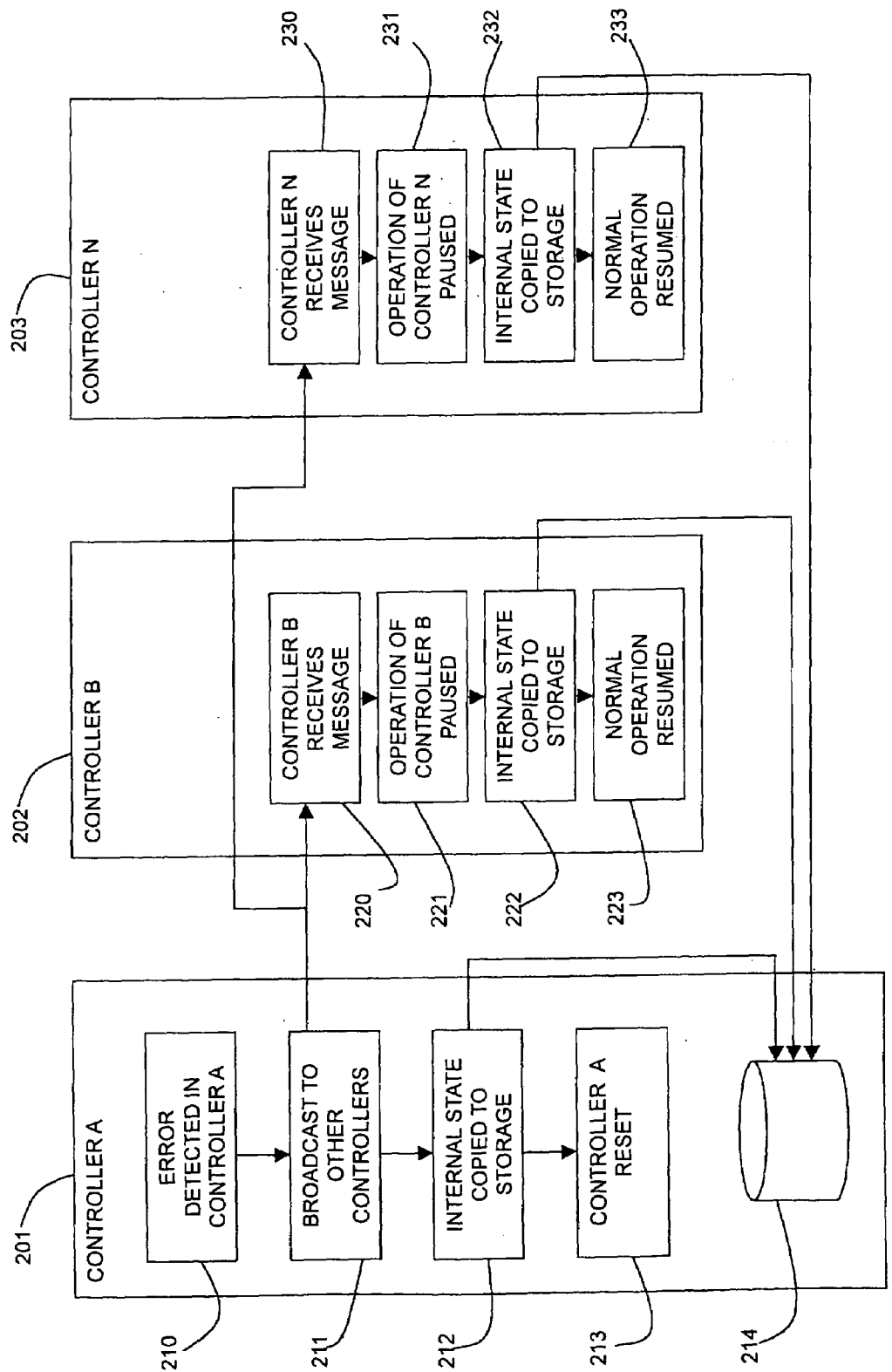
FIG. 2C is a flow diagram of a third embodiment in accordance with the present invention.

FIG. 2C shows a third embodiment of the described method in which the controller which detected the error, controller A 201, broadcasts 211 a message to the other controllers 202, 203 requesting that they send their internal state information to the broadcasting controller, controller A 201. The controller A 201 receives and stores the internal state information from all the controllers 201, 202, 203 in a storage buffer 214 in controller A 201.

This third embodiment allows controller A 201 to assemble a complete set of synchronised dumps for all the controllers 201, 202, 203 in the subsystem and store them in a single location.

Controller A 201 can save the complete set of synchronised dumps for all the controllers 201, 202, 203 to a storage location in the storage device array 215.

In another embodiment of the described method, a controller may detect the loss of one of the other controllers in the storage subsystem. When such a loss is detected by the detecting controller, it pauses its normal operation, copies its internal state information to a predetermined location then resumes normal operation without resetting itself. Problem analysis can be performed at a later stage using these internal state information dumps in conjunction with the corresponding dump obtained from the controller detecting the error in itself.

In further embodiments, the host computer may cause a first controller to dump. The host computer may issue a transaction to a first controller causing the first controller to dump but not to reset itself. The transaction may, additionally, cause the first controller to issue a message to its partner controllers, telling them to dump also. In an alternative, the host computer may issue a transaction to a first controller causing it to dump and reset. Such a transaction may, additionally, cause the first controller to issue a message to its partner controllers, telling them to dump also but not to reset.

A modification to any of the above embodiments is to record only a subset of the internal state information in order to reduce the period of time a controller is paused and the amount of space used for the dump.

The method takes advantage of the operation of dump-to-disk in Fibre Channel Arbitrated Loop (FC-AL) storage subsystems. A specific example of the described method is now provided in the context of FC-AL systems.

A FC-AL is a loop architecture where data and control signals pass along a single path. There may be a single loop or there may be two loops connected to the same devices for providing an alternative path to devices on a loop should one loop fail. There may also be more than two loops.

A typical FC-AL may have two host bus adapters and a set of approximately six disk drive enclosures or drawers, each of which may contain a set of ten to sixteen disk drives.

Figure 3:
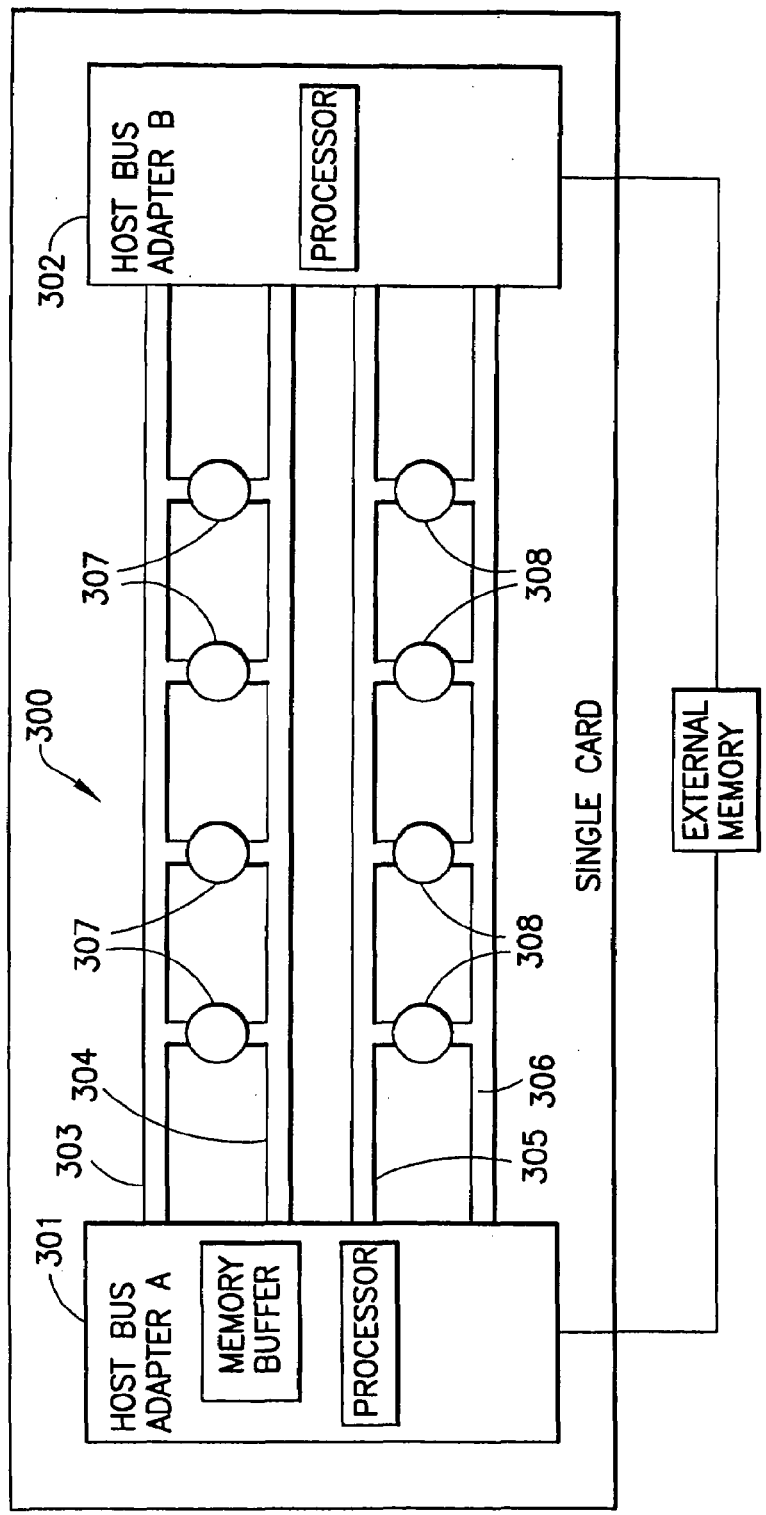
FIG. 3 is a block diagram of a Fibre Channel storage subsystem in which a method in accordance with the present invention may be carried out.

FIG. 3 is a block diagram of an FC-AL storage subsystem 300. Two controllers in the form of host bus adapters A and B 301, 302 are shown. There are four loops 303, 304, 305, 306 in this illustrated arrangement accessing two sets of disk drives 307, 308. Two of the loops 303, 304 access the first set of disk drives 307 and the remaining two loops 305, 306 access the second set of disk drives 308.

The two host bus adapters A and B 301, 302 are connected to a host computer (not shown) and provide redundant processing of transactions by the host computer.

In an FC-AL subsystem 300, for example as shown in FIG. 3, an adapter 301, 302 can receive a command to stop, save its internal status data and reset itself. Such a command is a "showstop" command and is invoked when an unusual error occurs in the firmware or a command is timed out, etc. A showstop command results in an adapter being unavailable to a host computer during the time that it is reset.

The feature of saving an adapter's internal status data is also referred to as "Dump to Disk" (DTD) and has two phases. Phase one runs when an adapter showstop occurs and copies data into external memory. Once this has been done, the adapter is reset. After the reset, the firmware will initialise and discover disks. Phase two then writes the saved away data out to an identified disk.

The described method provides a mechanism to create a dump, suitable for debugging a problem without requiring a showstop of an adapter. This is referred to as a "live dump". There are environments where it is unacceptable to showstop an adapter simply to obtain a dump. Showstopping and resetting an adapter is expected to take around 10 seconds. One example, of where such a stop is unacceptable is where one adapter showstops and in order to debug the problem a partner dump is required to provide a matched pair of dumps.

Some of the main requirements of a live dump are as follows:

It can be triggered by a partner adapter.
It can be triggered following an unusual condition in the firmware (e.g. timeout, unusual error recovery procedure, etc.).
It can be triggered from the host computer so that a live dump can be requested if the host sees something unusual.
It can be triggered without sending a transaction, so that a live dump can be triggered immediately on detecting an error condition.
It can also be triggered from a transaction so that test tools and user level processes can easily invoke it.
It will not cause the adapter to showstop.
It will not cause the adapter to exceed response time guarantees.
It will result in a consistent point in time cache coherent dump.
It will contain all information needed to debug the problem.
It will result in a file in compound dump format which can be read by a debugging tool such as a binary editor.

A live dump of an adapter can be invoked in a number of ways, including the following:

It can be invoked via a simple function call within the adapter firmware.
It can be invoked via a transaction to the debug service. This would be used by test applications and user level applications.
It can be invoked via a partner dump interface from a peer adapter.
It can be invoked via a doorbell bit on the host PCI (peripheral component interconnect). This will allow the device driver to request a dump without requiring resources to initiate a transaction.

In a real-time operating system, different processes operate on different threads. Typically a processor will be dedicated to one thread for a period of time before undergoing a context switch to the next thread. The period of time for which a processor is dedicated to one thread is here called a fibre. Fibres which are awaiting execution are held on a fibre queue. In a FC-AL environment, the live dump mechanism will run in the fibre context, not the interrupt context.

A flag is set when a live dump is invoked to prevent a new live dump from being invoked until the first live dump has been saved. The flag may be set to prevent a further live dump before the greater of a set timeout or the time taken to write the data to disk. The flag has the purpose of preventing a dump being corrupted or the dump process looping and never completing due to a subsequent dump starting before the first has completed. It can also be used to prevent a second dump being taken at all.

During a first phase of the live dump, a consistent snapshot of the bottom 32M of the control store is taken. This is written to the unused control store between 64M and 96M. The structures from external memory of the interface chip request queues and the operation error queues are also copied into the control store between 96M and 128M.

Fibre overrun logic is firmware which prevents a fibre executing for an excessive period of time and thereby degrading the overall system performance or exceeding timeouts. In an embodiment, the fibre overrun logic is modified not to showstop the adapter during a live dump. Live dumps must also run with interrupts disabled (including hardware interrupts and time manager interrupts) so that a live dump is not interrupted.

The image captured by a live dump does not need to survive a reset, unlike a dump to disk operation of a showstop. Therefore, the adapter can save the data to a control store which is faster to write than external memory.

Once the copy operation has been completed, a fibre is queued to invoke the standard dump to disk logic to write a formatted dump to the storage devices. Fibre queue processing resumes and fibre overrun checking is reinstated.

Once this has been completed, the live dump in progress flag is cleared to allow a new live dump to occur.

In a second phase of the live dump, when the dump to disk fibre reaches the head of the queue, the saved away data is written to disk in a similar way to the mechanism used for showstop dump to disk.

The dump cycles through destination disks to avoid overwriting recent dumps. Ideally live dumps and dump to disk occupy a different area of the disk so that they do not interfere with one another. The data dumped to disk is driven by entries in the dump memory map.

The adapter keeps a note of the destination for the most recent partner live dump so that it may be returned to the partner adapter via a peer gateway should the partner adapter inquire.

In addition to the data which was saved away during the first phase of the live dump, one additional area is dumped directly from its runtime location. This is the interface chip trace area from external memory. Within this trace area may be information which will be useful if the live dump relates to an interface chip problem.

The information saved in the dump may be controlled by the message received which triggered the dump. For example, in some scenarios a controller may detect a sanity error in the FC-AL interface chip and, consequently, may tell the other controllers to dump information which includes state information about the interface chip. In other error scenarios, this would not be relevant so the message would not indicate to dump the information about the interface chip.

In one embodiment of an invocation of a live dump, when an adapter showstops, it sends a message to other adapters on the loop to live dump. This is a snapshot message. When an adapter receives the snapshot message to live dump, it builds a data structure recording various vital pieces of information about the state of the card. This is the snapshot buffer. The contents of the snapshot buffer would be chosen to assist the debug of two-way problems in the adapter. When an adapter has copied the relevant information, it may store it in the control store, dump it to disk or transfer the snapshot buffer from the partner adapter using the peer gateway to the instructing adapter which adds it to the instructing adapters dump to disk dump. An adapter transaction could be provided to take an adapter snapshot at any time.

Improvements and modifications can be made to the foregoing without departing from the scope of the present invention.

What is claimed is:

1. A computer program product stored on a computer readable storage medium for maintaining data access during failure of a first controller in a multiple controller storage subsystem, the multiple controller storage subsystem having an array of data storage devices and at least one other controller for managing the data storage, comprising computer readable program code for performing: in a non-testing mode, the first controller detecting an error in the first controller and thereby initiating a process to maintain data access during failure of the first controller, the process to maintain data access during failure of the first controller comprising:

the first controller instructing the at least one other controller to save the at least one other controller's internal state information;

saving internal state information of the first controller by the first controller;

the first controller resetting itself after the saving of its internal state information;

pausing operation of the at least one other controller; and the at least one other controller saving its internal state information at the time of pausing, in parallel with the first controller's saving of its internal state information; and continuing operation of the at least one other controller, wherein only the first controller resets during the process to maintain data access during failure of the first controller, wherein the first and the at least one other controller make the array of data storage devices appear to a host computer as a single high capacity storage device, wherein the internal state information of the first and the at least one other controller is saved to permit diagnosis of the failure of the first controller, wherein a flag is set when internal status data save operation is occurring to prevent another internal status data save operation from being invoked, wherein the flag is set to prevent the another internal status data save operation from being invoked before the greater time period of a set timeout period and the time period to write the internal status data to a memory, wherein the storage subsystem comprises a Fibre Channel Arbitrated Loop system and the first controller and the at least one other controller comprise host bus adapters.

2. A computer program product as claimed in claim 1, wherein the first controller detects an error in the first controller which triggers the saving of the internal state information.

3. A computer program product as claimed in claim 1, wherein a host computer issues a transaction to the first controller which causes the first controller to save its internal state information.

4. A computer program product as claimed in claim 3, wherein the first controller resets after saving its internal state information.

5. A computer program product as claimed in claim 1, wherein the at least one other controller pauses operation, saves internal state information at the time of pausing, and continues operation when the at least one other controller detects a loss of the first controller such that access to the array of data storage devices is maintained.

6. A computer program product as claimed in claim 1, wherein the first controller and the at least one other controller each save their internal state information to a storage location corresponding to that controller.

7. A computer program product as claimed in claim 1, wherein the first controller and the at least one other controller save their internal state information to at least one storage device.

8. A computer program product as claimed in claim 7, wherein the internal state information is subsequently retrieved from the at least one storage device.

9. A computer program product as claimed in claim 1, wherein the first controller instructs the at least one other controller to transfer internal state information to the first controller.

10. A computer program product as claimed in claim 9, wherein the first controller saves the internal state information of the first controller and of the at least one other controller to the storage devices.

11. A computer program product as claimed in claim 1, wherein the first controller and the at least one other controller are combined on a single circuit card.

12. A computer program product as claimed in claim 1, wherein in addition to the internal state information, at least one of the first controller and the at least one other controller save external memory data corresponding to an interface chip trace area.

13. A computer program product as claimed in claim 1, wherein the at least one other controller saves a subset of internal state information.

14. A computer program product as claimed in claim 1, wherein the internal state information saved by the at least one other controller is determined by an instruction received from the first controller.

15. A computer program product as claimed in claim 1, wherein problem analysis regarding an error in the first controller is carried out on the saved internal state information.

16. A computer program product as claimed in claim 1, wherein during the at least one other controller pausing operation, saving internal state information at the time of pausing, and continuing operation, interrupts are disabled.

17. A computer program product as claimed in claim 1, wherein a flag is set in a host bus adapter during the saving of internal state information to prevent overlapping saves of internal state information in that adapter.

18. A computer program product as claimed in claim 1, wherein the host bus adapter saves information relating to an interface chip trace area.

19. A Fibre Channel Arbitrated Loop storage system according to claim 1, wherein one of the first and at least one other controller records the destination of a live dump of an other of the first and at least one other controller.

20. A Fibre Channel Arbitrated Loop storage system according to claim 19, wherein the controller that records the destination of a live dump provides the destination of the live dump to the other controller when the other controller inquires.

21. A computer program product as claimed in claim 1, wherein the first controller and the at least one other controller share a single memory.

22. A computer program product as claimed in claim 1, wherein a subset of the internal state information is saved in order to reduce the period of time the at least one controller is paused and to reduce the amount of storage space used to store the internal state information.

23. A method for maintaining data access during failure of a first controller in a multiple controller storage subsystem, the multiple controller storage subsystem having an array of data storage devices and at least one other controller for managing the data storage, the method comprising:
   in a non-testing mode, the first controller detecting an error in the first controller and thereby initiating a process to maintain data access during failure of the first controller, the process to maintain data access during failure of the first controller comprising:
   the first controller saving its internal state information;
   pausing operation of the at least one other controller; and
   the at least one other controller saving its internal state information at the time of pausing without resetting; and,
   continuing operation of the at least one other controller, wherein only the first controller resets during the process to maintain data access during failure of the first controller, wherein the internal state information of the first and the at least one other controller is saved to permit diagnosis of the failure of the first controller, wherein one of the first and at least one other controller records the destination of the saved internal state information of an other of the first and at least one other controller, wherein a flag is set when internal status data save operation is occurring to prevent another internal status data save operation from being invoked, wherein the flag is set to prevent the another internal status data save operation from being invoked before the greater time period of a set timeout period and the time period to write the internal status data to a memory, wherein the storage subsystem comprises a Fibre Channel Arbitrated Loop system and the first controller and the at least one other controller comprise host bus adapters.

24. A storage subsystem comprising at least two controllers for managing data storage, the at least two controllers coupled to at least one data storage device, the storage subsystem further comprising:
   a first controller of the at least two controllers adapted for saving its internal state information during a failure of the first controller in a non-testing mode, the first controller detecting an error in the first controller and thereby initiating a process to maintain data access during failure of the first controller; and,
   at least one other controller of the at least two controllers adapted for pausing its operation, and continuing its operation during the failure of the first controller, wherein only the first controller resets during the process to maintain data access during failure of the first controller, wherein the internal state information of the first and the at least one other controller is saved in order to permit diagnosis of the failure of the first controller, wherein a flag is set when internal status data save operation is occurring to prevent another internal status data save operation from being invoked, wherein the flag is set to prevent the another internal status data save operation from being invoked before the greater time period of a set timeout period and the time period to write the internal status data to a memory, wherein the storage subsystem comprises a Fibre Channel Arbitrated Loop system and the at least two controllers comprise host bus adapters.

25. A storage subsystem as in claim 24, wherein the first controller and the at least one other controller share an external memory.

26. A storage subsystem as in claim 24, wherein at least one of the first controller and the at least one other controller are disposed on a single circuit card.

27. A storage subsystem as in claim 24, wherein the storage subsystem comprises a Fibre Channel Arbitrated Loop system and the at least one other controller comprises a host bus adapter.

28. A storage subsystem as in claim 24, wherein the internal state information of the first controller and the at least two other controllers is stored in a storage buffer of the first controller.

29. A storage subsystem as in claim 24, wherein the internal state information of the first controller is stored in a storage buffer of the first controller and the internal state information of each of the at least two other controllers is stored in a storage buffer of a corresponding one of each of the at least two other controllers.

30. A Fibre Channel Arbitrated Loop storage system comprising:
   a first set of disk drives connected to a first set of loops, and a second set of disk drives redundant with the first set of disk drives and connected to a second set of loops; wherein a first adapter is connected to the first set of loops and a second adapter is connected to the second set of loops; each adapter being adapted for issuing a command to the other adapter to save internal status data and not reset itself, wherein each adapter is adapted for saving internal status data and resetting, wherein a flag is set when internal status data save operation is occurring to prevent another internal status data save operation from being invoked, wherein the flag is set to prevent the another internal status data save operation from being invoked before the greater time period of a set timeout period and the time period to write the internal status data to a memory.

31. A Fibre Channel Arbitrated Loop storage system according to claim 30, wherein the Fibre Channel Arbitrated Loop storage system has two contexts and two kinds of internal status data save operations.

32. A Fibre Channel Arbitrated Loop storage system according to claim 31, wherein the two contexts are a fibre context and an interrupt context and the two kinds of internal status data save operations are a live dump and a dump to disk.

33. A Fibre Channel Arbitrated Loop storage system according to claim 32, wherein resets are not permitted during a live dump.

34. A Fibre Channel Arbitrated Loop storage system according to claim 32, wherein when one of the first and second adapters live dumps, it sends a message to an other of the first and second adapters to build a data structure recording state information for debugging purposes.

* * * * *